United States Patent
Solak et al.

(10) Patent No.: US 9,742,177 B2
(45) Date of Patent: Aug. 22, 2017

(54) ELECTRICAL WIRE SEALING ASSEMBLY AND METHOD

(71) Applicant: GM Global Technology Operations LLC, Detroit, MI (US)

(72) Inventors: Addison T. Solak, Ypsilanti, MI (US); Edward J. Billings, Ann Arbor, MI (US)

(73) Assignee: GM Global Technology Operations, LLC, Detroit, MI (US)

(*) Notice: Subject to any disclaimer, the term of this patent is extended or adjusted under 35 U.S.C. 154(b) by 280 days.

(21) Appl. No.: 14/676,479

(22) Filed: Apr. 1, 2015

(65) Prior Publication Data
US 2015/0318680 A1 Nov. 5, 2015

Related U.S. Application Data

(60) Provisional application No. 61/987,808, filed on May 2, 2014.

(51) Int. Cl.
| | |
|---|---|
| *H02G 3/22* | (2006.01) |
| *H02G 15/013* | (2006.01) |
| *H02G 1/06* | (2006.01) |

(52) U.S. Cl.
CPC .......... *H02G 3/22* (2013.01); *H02G 1/06* (2013.01); *H02G 15/013* (2013.01); *Y10T 29/49004* (2015.01)

(58) Field of Classification Search
USPC ....... 174/152 G, 153 G; 439/604; 16/2.1, 2.2
See application file for complete search history.

(56) References Cited

U.S. PATENT DOCUMENTS

| | | | | |
|---|---|---|---|---|
| 5,170,017 | A * | 12/1992 | Stanevich | H02G 15/013 174/151 |
| 6,963,030 | B2 * | 11/2005 | Matsui | B60R 16/0222 16/2.1 |

* cited by examiner

*Primary Examiner* — Dhirubhai R Patel

(57) ABSTRACT

A seal assembly includes a circular resilient grommet-type seal having one or more through axial openings equal in number to the wires which pass through the seal and a rigid wire channel or guide which is received within a complementary pocket aligned with the seal between the seal and a reaction surface. The rigid wire channel or guide is retained in the pocket and carries any force exerted on the seal by pressure within the device to the aligned reaction surface. A method of installation includes the steps of mounting an electrical device within a component, routing the electrical wires leading from the device through an opening, routing the wires through corresponding openings in a grommet-type seal, pressing the seal into the opening, routing the wires through passageways in the rigid wire channel or guide and installing the guide in a complementary pocket which is aligned with the seal at one end and includes a reaction surface at the other end.

18 Claims, 5 Drawing Sheets

ELECTRICAL WIRE SEALING ASSEMBLY AND METHOD

CROSS REFERENCE TO RELATED APPLICATION

This application claims the benefit of U.S. Provisional Patent Application Ser. No. 61/987,808, filed May 2, 2014, which is hereby incorporated in its entirety herein by reference.

FIELD

The present disclosure relates to a sealing assembly for electrical wires passing between a pressurized region of an assembly and a non-pressurized region and, more particularly, to a sealing assembly and method for use with electrical wires passing between a pressurized region of an assembly or device and a non-pressurized region.

BACKGROUND

The statements in this section merely provide background information related to the present disclosure and may or may not constitute prior art.

Electrical wiring, both individual conductors and cables containing multiple conductors, provide electrical energy to lights, motors, solenoids and other electromechanical transducers as well as carry signals from sensors and data acquisition, storage and use devices in modern motor vehicles. Often such wiring must pass through a bulkhead or other static panel or separator between a region or chamber under higher pressure to a region or chamber under lower, often atmospheric pressure. Providing a pressure and often a fluid tight seal between such regions presents significant challenges, especially when the wiring seal is below the level of fluid in the device since the pressure differential will tend to force fluid from the higher pressure region to the lower pressure region. When such lower pressure region, as it often is, is on the outside of the device, in the atmosphere, fluid loss will be both apparent and may result in customer complaints.

Obviously, preventing any and all pressure or fluid loss in these situations is a desirable goal and the present invention is so directed.

SUMMARY

The present invention provides a seal assembly and method of installation for electrical wires, especially those traversing a bulkhead or boundary between a higher pressure region and a lower pressure region, such as the ambient. The seal includes a first component, namely a circular resilient grommet-type seal having one or more through axial passageways or openings equal in number to the wires or multiple conductor cables which will pass through the seal and a second component, namely, a rigid wire channel or guide which is received within a complementary pocket or cavity aligned with the seal between the seal and a reaction surface. The rigid wire channel or guide is retained in the pocket or cavity, exerts pressure on the seal to prevent it from being pushed out due to a pressure differential and carries any force exerted on the seal by pressure within the device to the aligned reaction surface.

The method of installation and use includes the steps of mounting an electrical device such as a solenoid, motor or sensor within a component—often a component which will be pressurized while operating, routing the electrical wires leading from the device through an opening in a stationary quill, bulkhead or panel, routing the wires through corresponding openings in a grommet-type seal, pressing the seal into the opening, routing the wires through passageways in a rigid wire channel or guide and installing the guide in a complementary pocket or cavity which is aligned with the seal at one end and includes a reaction surface at the other end.

Thus it is an aspect of the present invention to provide a seal assembly for electrical wires passing through a stationary quill, bulkhead or panel.

It is a further aspect of the present invention to provide a seal assembly for electrical wires passing through a stationary quill, bulkhead or panel, especially those traversing a boundary between a higher pressure region and a lower pressure region.

It is a still further aspect of the present invention to provide a seal assembly for electrical wires having two components.

It is a still further aspect of the present invention to provide a seal assembly for electrical wires having two components: a grommet-type seal having openings for receiving such wires and a rigid wire channel or guide which seats against the seal.

It is a still further aspect of the present invention to provide a seal assembly for electrical wires having two components: a grommet-type seal having openings for receiving such wires and a rigid wire channel or guide which seats against the seal and within a complementary pocket or cavity having a reaction surface.

It is a still further aspect of the present invention to provide a seal assembly for electrical wires having two components: a grommet-type seal having openings for receiving such wires and a rigid wire channel or guide which receives the wires and seats within a complementary pocket or cavity between the seal and a reaction surface.

It is a still further aspect of the present invention to provide a method of installing a seal assembly for electrical wires including a grommet-type seal having openings for receiving such wires and a rigid wire channel or guide which seats between the seal and a reaction surface.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 9:
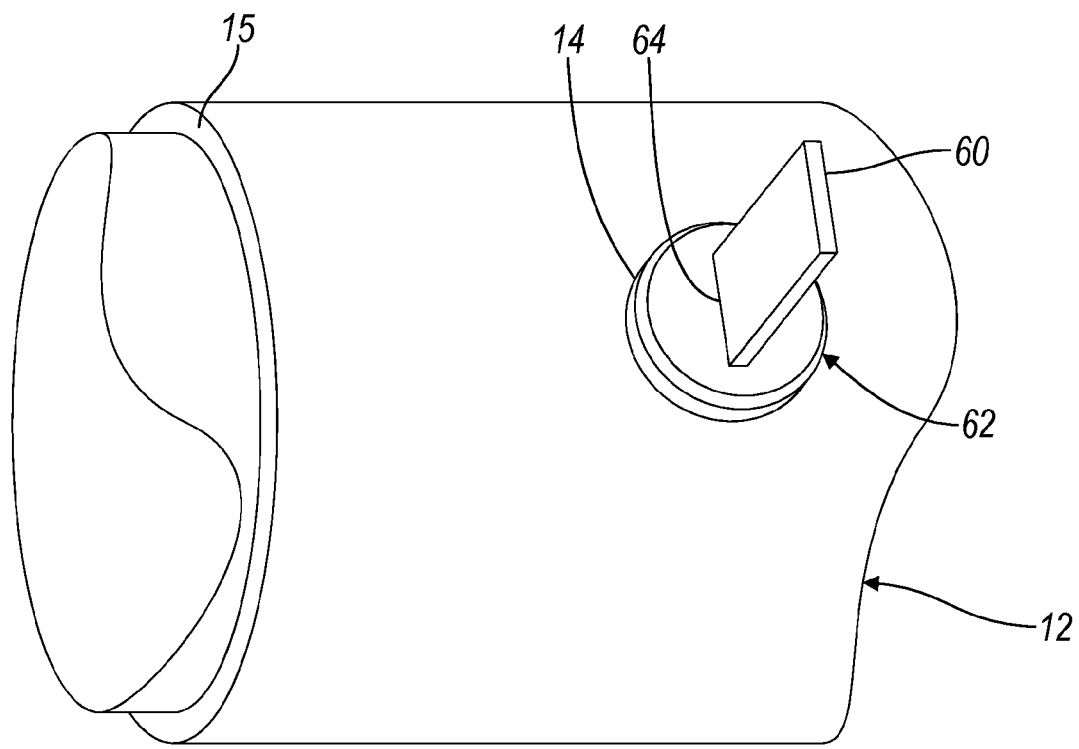
Figure 10:
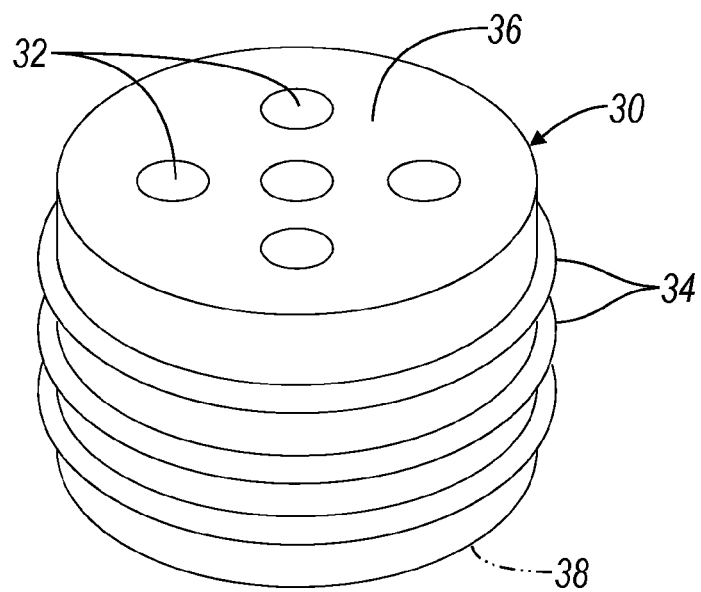

FIG. 9 is a fragmentary perspective view illustrating an alternate to the individual electrical wires, namely, a flat or ribbon cable of multiple conductors received within the grommet-type seal disposed in an opening in a hollow shaft or quill; and FIG. 10 is an enlarged perspective view of a grommet-type seal according to the present invention illustrating multiple through openings for receiving electrical wires and a plurality of circular peripheral sealing ribs or ridges.

DETAILED DESCRIPTION

The following description is merely exemplary in nature and is not intended to limit the present disclosure, application, or uses.

Figure 1:
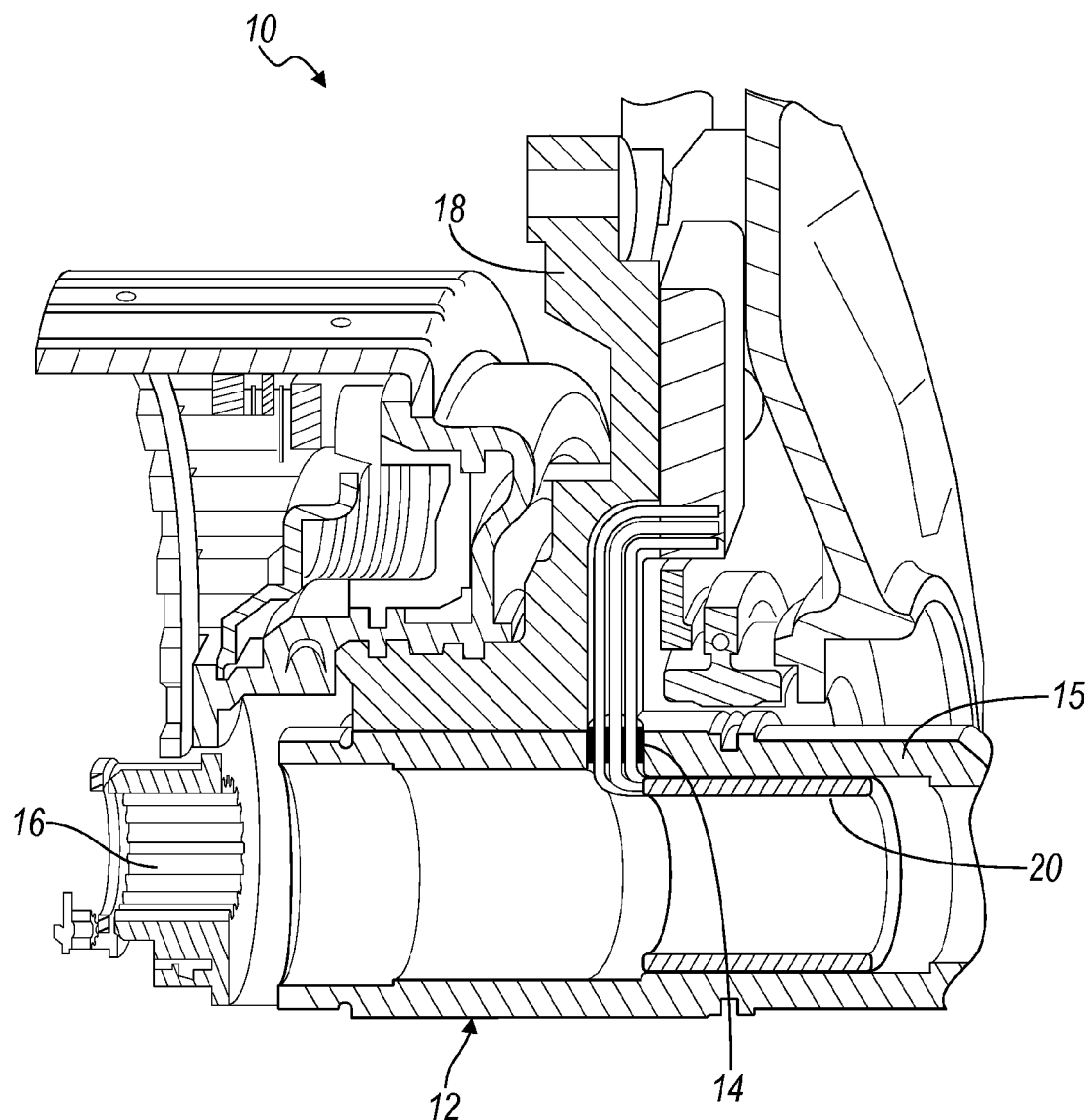
FIG. 1 is sectional perspective view of a portion of a motor vehicle driveline component incorporating a seal assembly according to the present invention.
Figure 2:
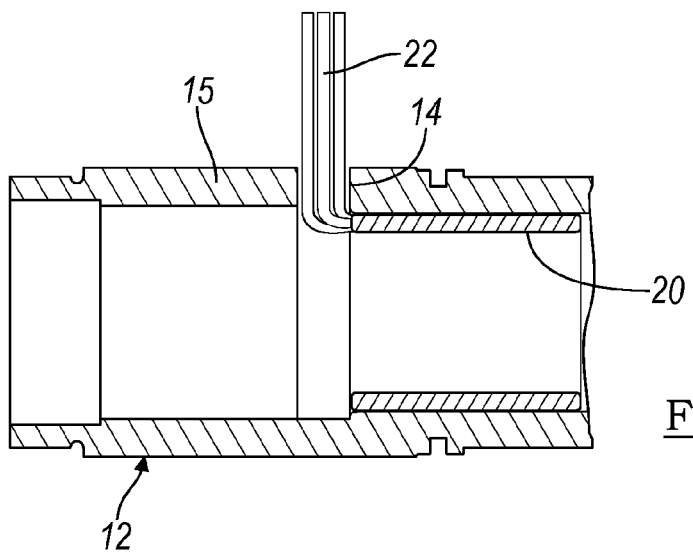
FIG. 2 is a fragmentary sectional view of a first step in the installation method wherein a sensor has been placed in and electrical wires routed through an opening in a hollow shaft or quill.

With reference to FIGS. 1 and 2, a portion of a motor vehicle driveline component incorporating a seal assembly according to the present invention is illustrated and generally designated by the reference number 10. The driveline component 10 which may be, for example, an automatic transmission, includes various features such as a hollow stationary shaft or quill 12, having an aperture or circular opening 14 in its wall or sidewall 15, a needle bearing assembly 16 and a bulkhead 18. Typically a rotating shaft (not illustrated) will extend through the stationary quill 12 and be supported by the needle bearing assembly 16. A sensor 20 such as a Hall effect sensor, variable reluctance sensor or similar device is disposed within the stationary quill 12 and senses rotation of the rotating shaft or other component. The region wherein the sensor 20 or other electrical component is located may, and often is, pressurized to several hundred p.s.i.

Figure 3:
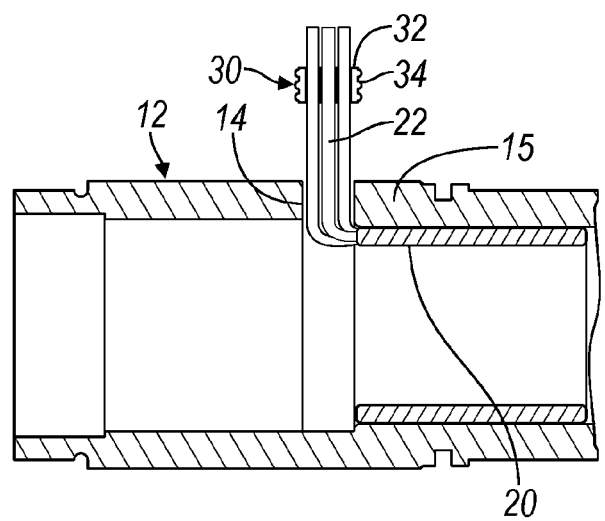
FIG. 3 is a fragmentary sectional view of a second step in the installation method wherein a grommet-type seal has been placed on electrical wires extending from an opening in a hollow shaft or quill.

As illustrated in FIGS. 2, 3, 4 and 10, and by way of example, an exciting voltage and signals from the sensor 20 are carried in a plurality of electrical wires 22 between the sensor 20 and associated electrical supply and data gathering devices (not illustrated). In the present embodiment, five electrical wires 22 are utilized and illustrated although more or fewer may be utilized, such as one, two, three or more. In FIG. 2, the electrical wires 22 have been routed from the sensor 20 and through the circular opening 14 in the stationary quill 12. In FIG. 3, a grommet-type seal 30 having a plurality of through openings 32 equal in number to the number of electrical wires 22 has been slipped thereon and is ready for installation in the circular opening 14. As illustrated in FIG. 10, and again by way of example, the grommet-type seal 30 includes five through openings 32 which are arranged with a single opening 32 in the center of the grommet-type seal 30 and four openings 32 arrayed at equal 90° intervals thereabout. The openings 32 are preferably sized to provide an interference fit with the electrical wires 22.

Figure 4:
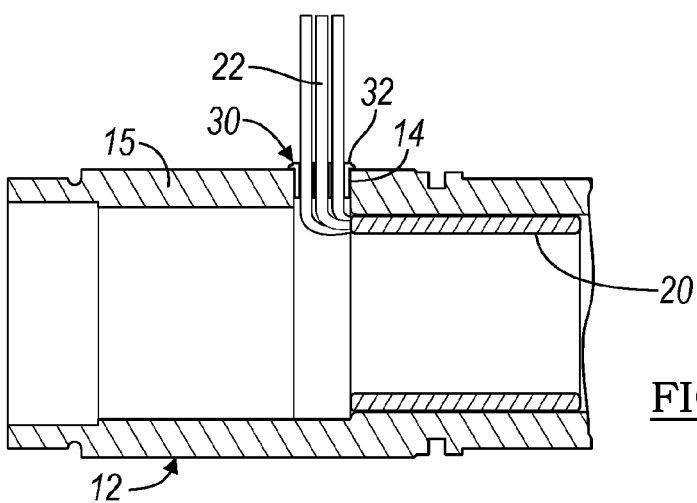
FIG. 4 is a fragmentary sectional view of a third step in the installation method wherein a grommet-type seal with electrical wires passing therethrough has been installed in an opening in a hollow shaft or quill.

It should be appreciated that more or fewer openings 32 for the electrical wires 22, a single round opening for a multiple conductor cable or a rectangular opening for a ribbon cable (as illustrated in FIG. 9) may also be utilized on the grommet-type seal 30. The seal 30 also includes a plurality of circular, axially spaced apart ribs or ridges 34 which extend around its periphery and achieve an interference fit with the opening, such as the aperture or circular opening 14, in which it is installed. In FIG. 4, the grommet-type seal has been slipped further along the electrical wires 22 and installed into the circular opening 14 in the sidewall of the stationary quill 12.

Figure 5:
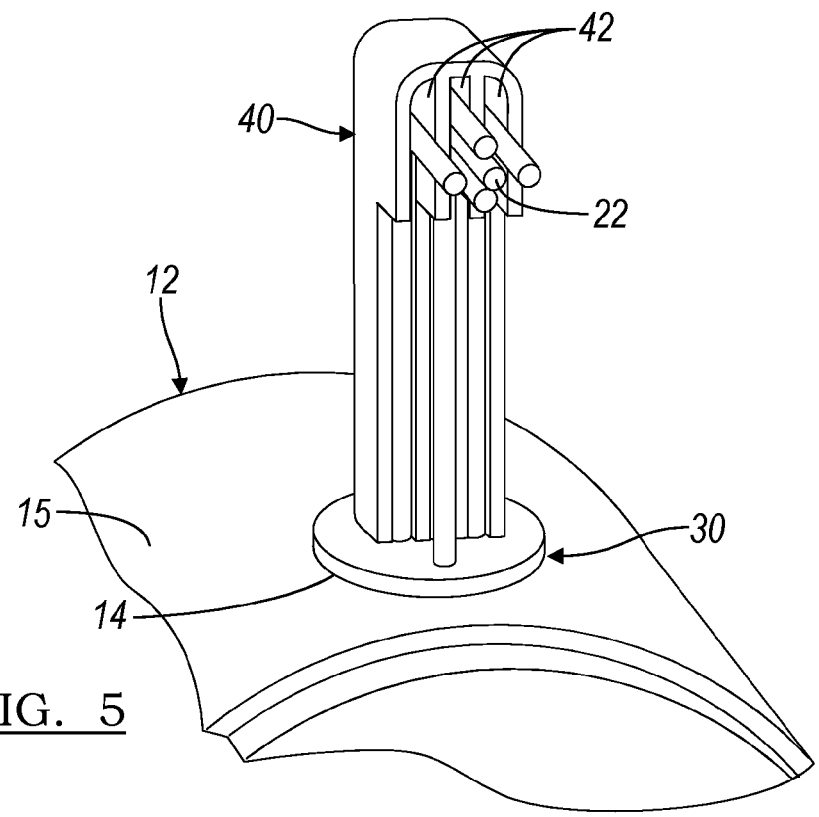
FIG. 5 is an enlarged perspective view of a fourth step in the installation method wherein a rigid channel or guide has been placed on the electrical wires extending from the grommet-type seal in a hollow shaft or quill.
Figure 6:
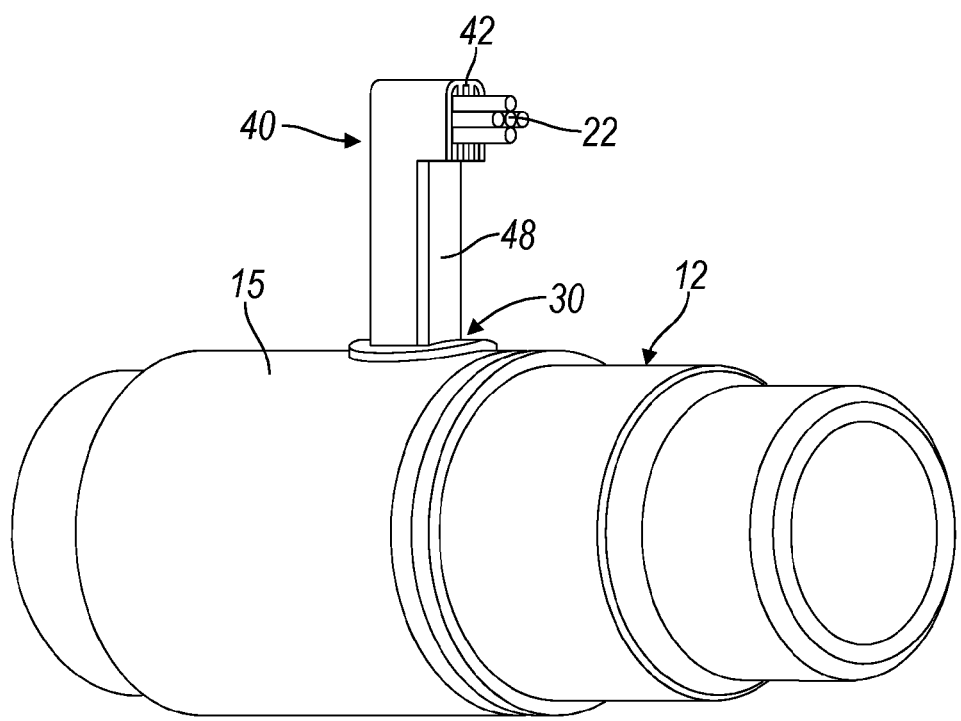
FIG. 6 is an enlarged perspective view of a fifth step in the installation method wherein a cover has been placed on the rigid channel or guide and the hollow shaft or quill with the sensor and seal assembly according to the present invention is ready for assembly with the driveline component of FIG. 1.

Referring now to FIGS. 5 and 6, a rigid channel or guide 40 having one or more elongate slots or tracks 42 which are generally complementarily arranged so that the pattern of the through openings 32 in the grommet-type seal 30 aligns with the arrangement of slots or tracks 42 in the rigid channel or guide 40. In the example illustrated and as noted above, the five through openings 32 are arranged with a single opening 32 in the center of the grommet-type seal 30 and four openings 32 arrayed at equal 90° intervals thereabout. Thus, with appropriate rotational positioning of the grommet-type seal 30, three of the electrical wires 22 can be carried in a middle or inner slot or track 42 of the rigid channel or guide 40 having three slots or tracks 42 and a single electrical wire 22 can be carried in each of the outboard or outer slots or tracks 42. In FIG. 6, a cover 48 has been installed over the three slots or tracks 42 carrying the electrical wires 22 to protect them and positively retain them in the slots or tracks 42 of the rigid channel or guide 40.

The rigid channel or guide 40 and the cover 48 are preferably fabricated of a high temperature, high performance polymer such as a glass fiber reinforced thermoplastic or polymer, nylon 66, or a glass filled polyamide or polyimide.

Figure 7:
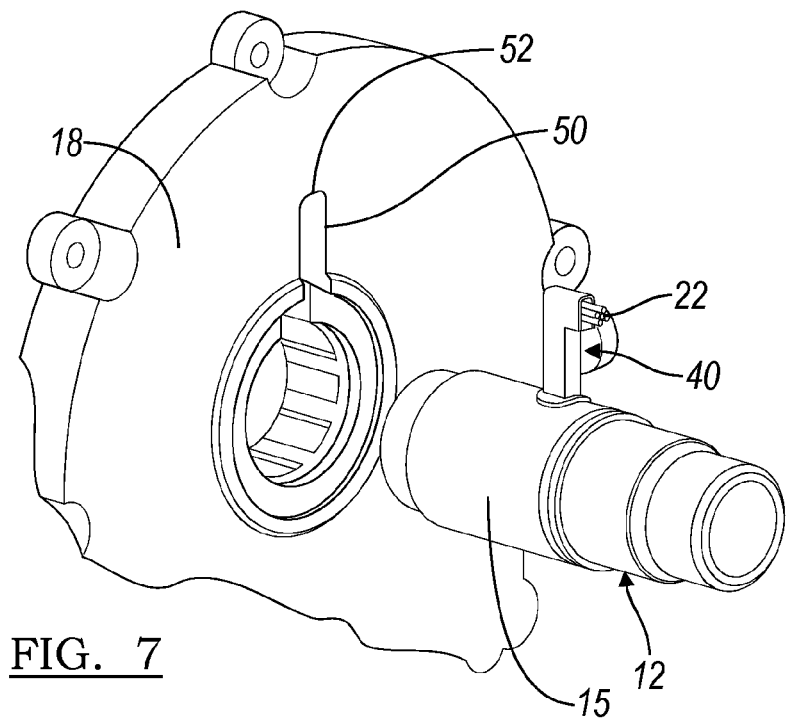
FIG. 7 is a perspective view of a sixth step in the installation method wherein the hollow shaft or quill with the sensor and seal assembly according to the present invention is being assembled with the driveline component of FIG. 1 having a pocket or cavity for receiving the rigid channel or guide.
Figure 8:
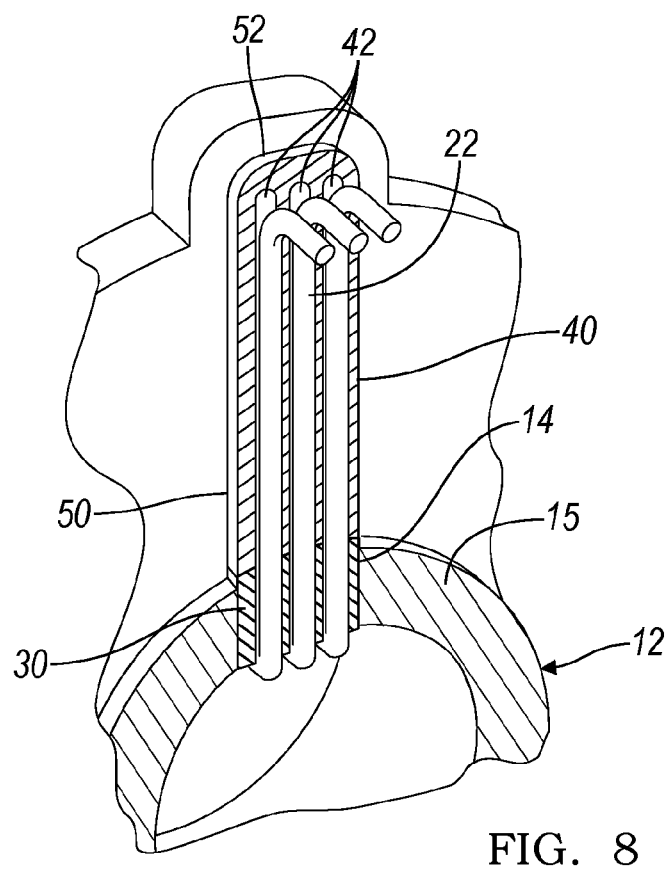
FIG. 8 is an enlarged perspective view of the seal assembly according to the present invention assembled with the driveline component of FIG. 1 wherein the rigid channel or guide is disposed within the pocket or cavity between the seal and a reaction surface.

Referring now to FIGS. 7 and 8, the bulkhead 18 of the driveline component 10, such as a transmission, includes a radially oriented channel, cavity or pocket 50 that aligns with the circular opening 14 in the stationary quill 12 and the grommet-type seal 30 when the stationary quill 12 is installed and fully seated in the bulkhead 18. The radially oriented channel or pocket 50 has a length, width and depth substantially equal to the length, width and depth of the rigid channel or guide 40 and includes a reaction surface 52 at its end opposite the stationary quill 12 and the grommet-type seal 30. In FIG. 8, the rigid channel or guide 40 is illustrated in its fully seated position in the radial channel, cavity or pocket 50 with its inner end against the grommet-type seal 30 and its outer end in contact with the reaction surface 52. Thus, any pressure or force against the seal 30, tending to dislodge it, is carried through the rigid channel or guide 40 to the reaction surface 52.

Referring now to FIG. 9, the hollow shaft or quill 12 is illustrated with an alternate wire configuration, namely, a flat or ribbon cable 60 of multiple conductors received within a grommet-type seal 62 disposed in the aperture or circular opening 14. With this flat or ribbon cable 60, the grommet-type seal 62 defines or includes a rectangular through opening 64 which is complementary to the exterior of the flat or ribbon cable 60 and which, again, achieves an interference fit with the cable 60.

Referring now briefly to FIG. 10, the grommet-type seal 30 is illustrated. The grommet-type seal 30 includes a one or more through axial openings 32 which achieve an interference fit with the electrical wires 22 (or the ribbon cable 60) and one or more circular, axially spaced apart ribs or ridges 34 which extend around its periphery and achieve an interference fit with the opening, such as the aperture or circular opening 14, in which it is installed. The grommet-type seal 30 defines a first circular end 36 and a second circular end 38. The grommet-type seal 30 is preferably fabricated of a resilient material such as rubber, a thermoplastic elastomer or a thermosetting elastomer.

The description of the invention is merely exemplary in nature and variations that do not depart from the gist of the invention are intended to be within the scope of the invention. Such variations are not to be regarded as a departure from the spirit and scope of the invention.

What is claimed is:

1. A sealing assembly for disposition in an aperture in a sidewall and spaced from a reaction surface in a pocket of a bulkhead comprising, in combination, a resilient grommet having an end, a periphery, at least one opening in said end, extending through said grommet and adapted to receive a conductor and at least one circumferential rib extending about said periphery of said grommet, and a rigid guide having a first end and a second end, at least one open channel extending from said first end along said guide and adapted to receive said conductor, said first end adapted to contact said end of said grommet with said channel in alignment with said opening and said second end adapted to contact said reaction surface of said bulkhead to maintain said grommet in said aperture.

2. The sealing assembly of claim 1 wherein an axial distance between said aperture and said reaction surface is substantially equal to a length of said rigid guide.

3. The sealing assembly of claim 1 wherein said grommet includes a plurality of circumferential ribs.

4. The sealing assembly of claim 1 wherein said grommet includes a plurality of through openings.

5. The sealing assembly of claim 1 wherein said rigid guide includes a plurality of channels.

6. The sealing assembly of claim 1 wherein said reaction surface is substantially axially aligned with said opening.

7. The sealing assembly of claim 1 further including an electrical conductor disposed in said opening in said grommet and in said channel in said rigid guide.

8. The sealing assembly of claim 1 further including a cover disposed over said at least one open channel of said rigid guide for retaining said conductor in said at least one open channel.

9. A sealing assembly for at least one electrical conductor for disposition in a circular aperture in a quill and spaced from a reaction surface in a cavity of a bulkhead comprising, in combination, a resilient circular grommet having a first circular end, a second circular end, a periphery, at least one opening for receiving said at least one electrical conductor and extending through said grommet from said first circular end to said second circular end and at least one circumferential rib extending about said periphery of said grommet, and a rigid guide having a first end and a second end, at least one open channel extending from said first end along said guide, said first end adapted to contact said first end of said circular grommet with said open channel in alignment with said opening and said second end adapted and configured to contact said reaction surface substantially aligned with said grommet to maintain said grommet in said circular aperture.

10. The sealing assembly for electrical conductors of claim 9 wherein an axial distance between said aperture and said reaction surface is substantially equal to a length of said rigid guide.

11. The sealing assembly for electrical conductors of claim 9 wherein said grommet includes a plurality of circumferential ribs.

12. The sealing assembly for electrical conductors of claim 9 wherein said grommet includes a plurality of through openings.

13. The sealing assembly for electrical conductors of claim 12 further including an electrical conductor disposed in one of said through openings in said grommet and having an interference fit and in said channel in said rigid guide.

14. The sealing assembly for electrical conductors of claim 9 wherein said rigid guide includes a plurality of channels.

15. A method of sealing an electrical conductor through an aperture in a wall aligned with a reaction surface of a channel, comprising the steps of: routing at least one electrical conductor through said aperture in said wall, providing a grommet having at least one though opening, threading said electrical conductor through said at least one through opening in said grommet, installing said grommet in said aperture, providing a rigid guide having at least one open channel for receiving said at least one electrical conductor, routing said at least one electrical conductor in said open channel, and installing said rigid guide between said grommet and said reaction surface, whereby said grommet is maintained in said aperture by said rigid guide.

16. The method of sealing an electrical conductor through a wall of claim 15 including the further step of routing said at least one electrical conductor away from said channel in said rigid guide.

17. The method of sealing an electrical conductor through a wall of claim 15 including the further step of providing an interference fit between said at least one electrical conductor and said at least one through opening in said grommet.

18. The method of sealing an electrical conductor through a wall of claim 15 including the further step of providing a cover to close said at least one open channel in said rigid guide.

* * * * *